Dec. 5, 1967  YOSHIO MAENAKA  3,356,336
AIR-TIGHT SEALING DEVICE FOR A VALVE SEAT OF A BUTTERFLY VALVE
Filed Dec. 21, 1965

INVENTOR
Yoshio Maenaka

BY Lawrence I. Field
ATTORNEY

United States Patent Office 3,356,336
Patented Dec. 5, 1967

3,356,336
AIR-TIGHT SEALING DEVICE FOR A VALVE
SEAT OF A BUTTERFLY VALVE
Yoshio Maenaka, Yokohama, Japan, assignor to Maenaka
Valve Works Co., Ltd., Tokyo, Japan
Filed Dec. 21, 1965, Ser. No. 515,366
Claims priority, application Japan, Apr. 20, 1965,
40/30,873; Oct. 12, 1965, 40/82,666
3 Claims. (Cl. 251—306)

ABSTRACT OF THE DISCLOSURE

A device for maintaining air-tight sealing of a butterfly valve comprising a specially shaped annular ring fitting in the valve seat.

---

Figure 1:
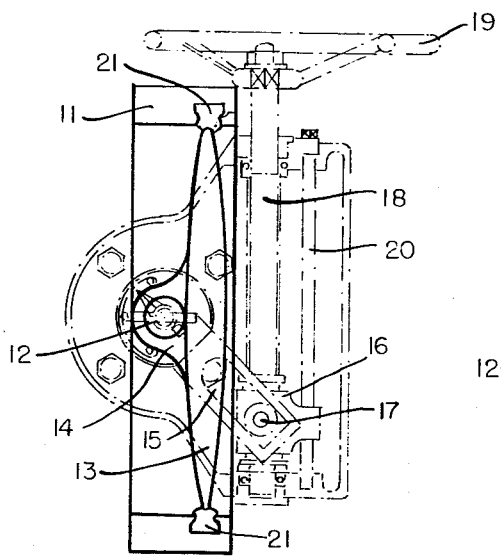

The present invention relates to a device which is capable of improving the air-tight sealing of a valve seat of a butterfly valve.

In the conventional device for the above mentioned purpose of maintaining the air-tight sealing of a valve seat of a butterfly valve, it is a common practice to provide an annular groove or recess around the inner periphery of a valve seat and to fit into said groove or recess a ring of a resilient material such as rubber whereby the ring makes contact with the periphery of the valve plate so that air-tight sealing may be effected. However, in the above stated device or method leakage cannot be prevented because the valve plate is in contact only with the surface of such resilient material so that the complete closure against liquid or steam under high pressure cannot be made.

The present invention is characterized in that a special shaped resilient annular ring is fitted into the valve seat whereby the air-tight sealing at the contact face of the surface of said annular ring with the peripheral surface of the valve plate can be maintained completely and furthermore the air-tight sealing between the bottom surface of the annular ring and the inner wall surface of the fitting portion can be also maintained perfectly, thus preventing leakage when the valve plate is closed.

Bearing in mind the foregoing, the principal object of this invention is to provide an air-tight sealing for a valve seat of a butterfly valve by fitting to the valve seat an annular ring which has a special sectional form and is made of resilient material such as rubber; forming one surface of said annular ring into a form of a circular arc and providing an air-tight pressing portion at the lower surface of the main body; and contacting at the above position the annular ring with the bottom surface of the fitting portion whereby the air-tight sealing of the contacting portion can be effected by means of the inner and the outer surfaces of said annular ring.

Another object of the present invention is to improve the contact strength (of the annular ring with the valve plate) by fitting into the recessed portion of the valve seat the major portion of resilient annular ring which is made of resilient material such as rubber; forming the projecting portion of said annular ring into the shape of a circular arc; and after the peripheral surface of the valve plate makes contact with the surface of said circular arc for closing the valve, expanding the contact surface area relative to the peripheral surface of the valve plate as the shape of the circular arc of the annular ring is enlarged when the pressure of the liquid within the valve is increased.

Another object of the present invention is to prevent leakage by fitting into the recessed portion of the valve seat the major portion of a resilient annular ring made of resilient material such as rubber; forming a central projected portion and projected edge portions on both sides in order to provide an air-tight sealing which is forcibly pressed into the recessed portion of the valve seat whereby the fluid which flows from the periphery of said annular ring can be prevented from being leaked because said central projection portion and one of the projected edge at one side are caused to contact each other very strongly as the pressure within the valve is increased.

A further object of the present invention is found in the fact that a resilient annular ring made of rubber which is fitted into the valve seat is made into a circular shape at the outer surface thereof and is provided with a central projected portion and expanding forms of the projected edges on both sides; a substantial space or volume may be available when the whole annular ring is pressed into the valve seat; and the annular ring may be located at any desired position at the fitting portion.

Figure 2:
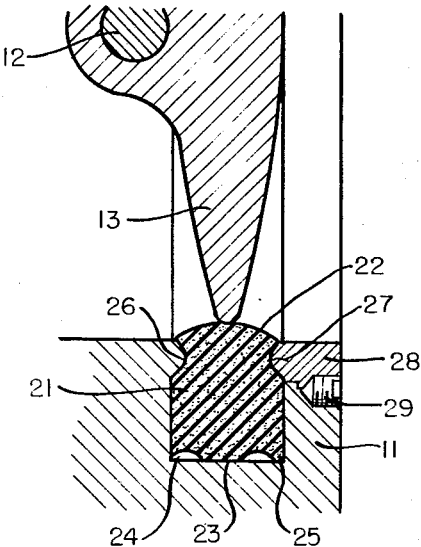
Figure 3:
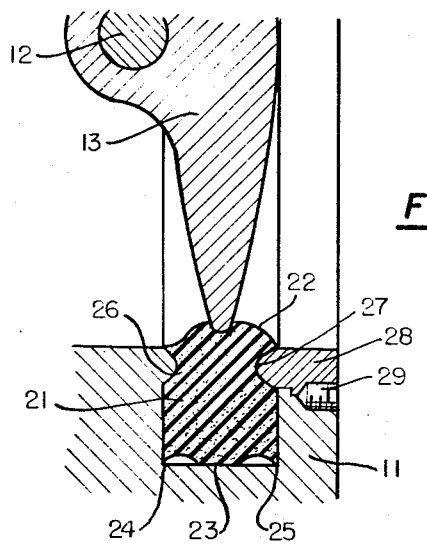

Now the structure of a device according to the present invention will be described with reference to the accompanying drawing; in which FIG. 1 is a sectional view of a butterfly valve illustrating one example of the relation with a closing and opening driving device of the valve plate;

FIG. 2 is a partial sectional view illustrating the manner of contact of the tip end portion of the valve plate with the annular rubber ring embedded at the valve seat; and FIG. 3 is a sectional view similar to FIG. 2, but specifically illustrating the manner in which the annular rubber ring is expanded due to the pressure of the fluid within the valve.

Now referring to FIG. 1, there is schematically illustrated a butterfly valve and a well-known type of device for actuating the valve. A valve plate 13 is rotatably supported by a transverse shaft 12 which is located at a position somewhat eccentric to the center portion of a valve body 11. The end of the transverse shaft 12 of said valve plate 13 extends from the valve body 11 and is securely fixed to the base portion of an actuating rod 14. A threaded rod 18 is located in the longitudinal direction and is free to be rotated by means of a handle wheel 19, and a sliding member 16 is threaded into the threaded rod 18 at the top portion thereof. Further, a pin 17 provided at the side surface of said sliding member 16 is fitted into a guide groove 15 of said actuating rod 14 so that the actuating rod 14 may be swung by the vertical movement of said sliding member 16. In this manner, butterfly shaped valve plate 13 is rotated around the shaft 12 so that closing and opening operation of the valve body 11 may be effected. The reference number 20 designates a sliding guide rod of the sliding member 16 which is upstanding in the longitudinal direction in parallel with the threaded shaft 18.

An annular rubber ring 21 is embedded at a location where the peripheral end of the valve plate 13 is positioned when the inner wall surface of the valve body 11 is closed, so that the end of said valve plate 13 makes contact with the circular shaped surface 22 of the annular rubber ring 21 with a suitable pressing force. Said annular rubber ring 21 has a substantial volume and at the bottom of the annular rubber ring 21 which is in contact with the bottom of the groove or recess are provided a central projected portion 23 and projected edges 24 and 25 at both sides of the ring. Furthermore, the annular rubber ring 21 is provided with notch portions 26 and 27 which mate with protruberances located on both sides of the embedding wall of the valve body 11. One of said notch portions 27 is secured by means of a fitting ring 28, which in turn is secured in position by means of a set screw 29.

When the valve plate 13 is in a closing position as shown in FIG. 2, the surface of the circular face of the annular rubber ring 21 is in contact with the peripheral surface of the end of the valve plate 13 so that leakage from this portion can be prevented. And for the embedding surface of the valve body 11 in which the annular rubber ring 21 is fitted, the notch portion 26, the central projected portion 23 and either of the projected edges 24 or 25 effect the sealing operation in the leakage direction. Therefore, the leakage from the contacting portion can be completely prevented.

Furthermore, the pressure of fluid applied to the first or primary side is increased after the valve plate 13 is closed, the volume of the annular rubber ring 21 is expanded as shown in FIG. 3 due to the pressure so that the circular shaped surface 22 is caused to expand in the front and rear sides of the contacting portion of the valve 13 whereby the air-tight sealing at this portion is improved.

Since the annular rubber ring 21 is embedded within the valve body 11 with a substantial volume, the abrasion and damage of the circular surface can be avoided because of its elasticity even when the end of the valve plate 13 is repeatedly placed in contact with said surface when the valve plate 13 is closed or opened. Therefore, the durability of the annular rubber ring is excellent. With the above stated valve seat structure, leakage can be prevented even when the valve plate of the butterfly valve is closed completely.

It must be understood that various modifications and changes can be made in the design without departing from the spirit and the scope of the present invention.

What I claim is:

1. In a butterfly valve including a valve body, a valve seat in said body, and a valve plate adapted to move between open and closed positions, the improved air-tight sealing device for said valve seat of said butterfly valve, said valve seat including a groove in the inner wall of said valve body and an annular rubber ring whose section has a circular surface at the upper portion thereof and a central projected portion and projected edge portions at both sides of the bottom of said ring, said ring being embedded into said groove in the inner wall of said valve body at a location where the peripheral end of said valve plate is in very close contact when the butterfly valve is closed whereby the circular surface of the annular rubber ring is in contact with the peripheral surface of the valve plate when the valve plate is moved to its closed position.

2. An air-tight sealing device for a valve seat of a butterfly valve according to claim 1 wherein the circular surface of the annular rubber ring which is embedded into the inner wall of the valve body is expanded due to the pressure applied at the primary or first side of the valve when the butterfly valve is closed.

3. An air-tight sealing device for a valve seat of a butterfly valve according to claim 1 wherein said annular rubber ring is embedded into the inner wall of the valve body at the location where the peripheral end of the valve plate makes contact when the butterfly valve is closed; said annular rubber ring is provided with notch portions on both sides of the embedded portion thereof; and one of said notch portions is secured by a fitting ring.

References Cited

UNITED STATES PATENTS

| 2,488,380 | 11/1949 | Danks | 251—173 |
| 2,965,354 | 12/1960 | Grove et al. | 251—176 |
| 3,080,145 | 3/1963 | Swain | 251—306 |

FOREIGN PATENTS

| 1,181,609 | 8/1957 | France. | |

M. CARY NELSON, *Primary Examiner.*

R. J. MILLER, *Assistant Examiner.*